April 30, 1968     R. G. MINER     3,380,262
REFRIGERATION APPARATUS WITH LOAD LIMIT CONTROL
Filed Nov. 21, 1966     2 Sheets-Sheet 1

*INVENTOR.*
ROBERT G. MINER
BY Arthur O. Andersen
ATTORNEY

April 30, 1968 R. G. MINER 3,380,262
REFRIGERATION APPARATUS WITH LOAD LIMIT CONTROL
Filed Nov. 21, 1966 2 Sheets-Sheet 2

INVENTOR.
ROBERT G. MINER
BY Arthur O. Andersen
ATTORNEY

United States Patent Office 3,380,262
Patented Apr. 30, 1968

3,380,262
REFRIGERATION APPARATUS WITH
LOAD LIMIT CONTROL
Robert G. Miner, La Crosse, Wis., assignor to The Trane
Company, La Crosse, Wis., a corporation of Wisconsin
Filed Nov. 21, 1966, Ser. No. 595,754
17 Claims. (Cl. 62—209)

ABSTRACT OF THE DISCLOSURE

This invention relates to refrigeration apparatus having control means including fluid devices for operating the apparatus at a capacity which corresponds with the refrigeration load on the apparatus and limiting the capacity of the compressor of the refrigeration apparatus to prevent exceeding a maximum safe current through the driving motor of the compressor.

---

Refrigeration apparatus is controlled to maintain a desired temperature of refrigerant supplied to the refrigeration load. There are several conditions under which the motor will tend to draw a current of a magnitude such that the motor will be damaged. When refrigeration apparatus is started after it has been at rest for a period of time, the suction pressure is substantially equal to the saturation pressure of the refrigerant at the ambient temperature. This pressure is higher than the normal suction pressure with the result that the flow rate through the compressor is considerably increased. A high flow rate through the compressor will put a high load on the motor and the motor will draw a current which will damage the motor.

Low voltage to the motor is another condition which will cause the motor to draw an excessive current. Various other conditions may cause the motor to draw an excessive current.

This invention is similar in some respects to that shown in my U.S. Patents 2,817,213 and 2,955,436.

The devices of these patents employ pneumatic thermostats and pneumatic relays and the output of the pneumatic relay is prevented from exceeding a value which would allow the machine to operate at conditions which would overload the motor.

I have found that for some applications, it is desirable from the standpoint of reliability of operation and low cost of manufacture to use an electric to pneumatic transducing thermostat and fluid amplifying devices as part of a load limit control.

It is an object of this invention to provide electric to fluid transducing thermostats for use in fluid control systems.

It is another object of this invention to provide a control system having an electric to fluid transducing thermostat with fluid powered compressor output control means to operate a refrigeration compressor according to the refrigeration load.

It is another object of the invention to provide means for measuring the value of the electric current through the driving motor of the compressor and to use this measurement with fluid amplifying transducing means to control the flow of gas to the compressor to prevent exceeding a predetermined maximum motor current.

It is another object of the invention to provide means for setting the load limit device at 100 percent of full load capacity or some increment of full load capacity such as 60 percent or 40 percent. When it is known that the load will be less than full load for a given period, the load limit device may be set at the desired reduced capacity in order to avoid paying the supplier of electrical energy a demand charge on a higher capacity which might be desired only for a few hours during the period.

Other objects and advantages of the invention will become apparent as the specification proceeds to describe the invention with reference to the accompanying drawings in which.

Figure 1:
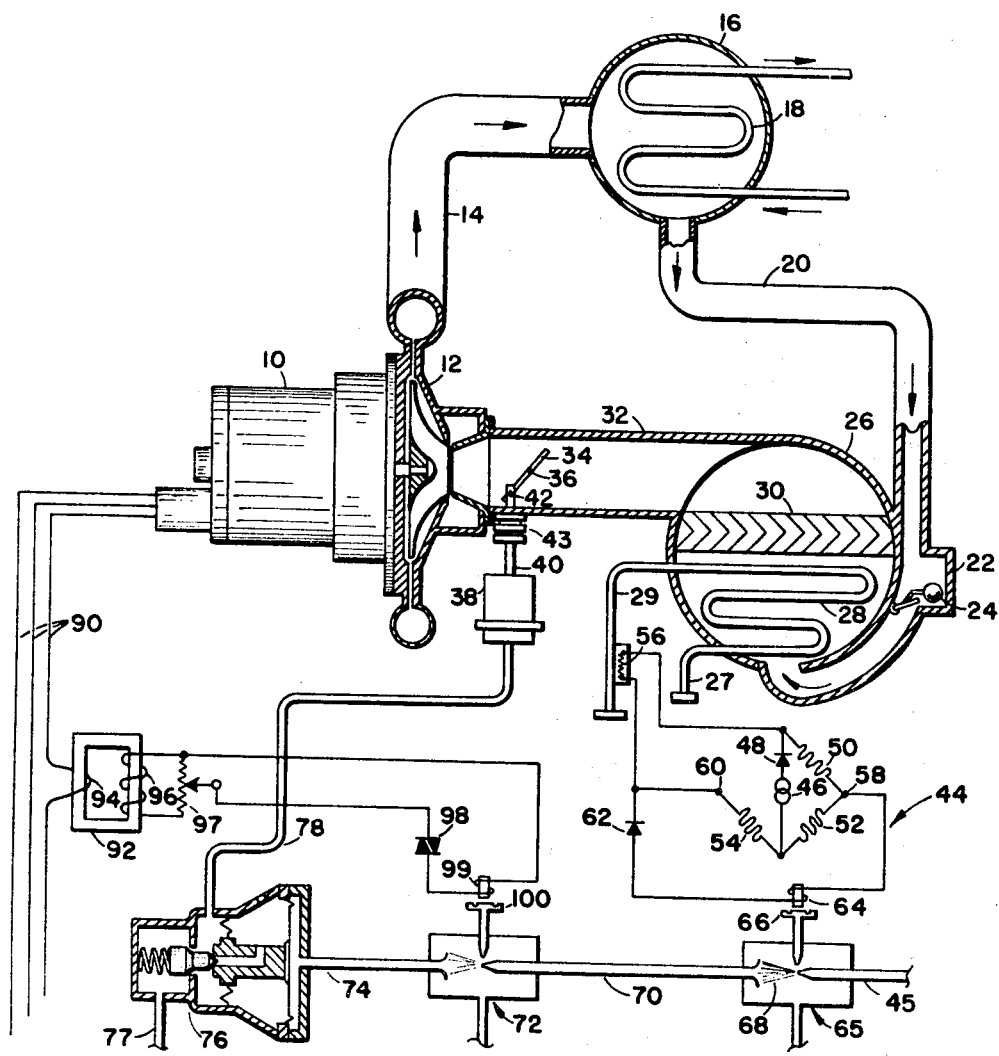
FIGURE 1 is a diagrammatic view of a control system of this invention.

Reference is made to FIGURE 1 in which an electric motor 10 is connected to and drives a compressor 12. The compressor 12 discharges the refrigerant gas into a pipe 14 which conducts the gas to a condenser 16. The condenser is preferably of the shell and tube type in which cooling water flows through the tubes 18 and the refrigerant is in the shell outside the tubes. Refrigerant liquid condensed in condenser 16 flows by gravity through pipe 20 to a float chamber 22. Float 24 in float chamber 22 opens and closes to control the flow of refrigerant liquid to an evaporator 26 which is preferably of the shell and tube type in which a secondary refrigerant liquid such as chilled water flows from the load through conduit 27 into the tubes 28 and from tubes 28 through conduit 29 back to the load. In removing heat from the chilled water, the refrigerant in the evaporator 26 boils forming gas which passes through the liquid eliminator 30 and thence into the suction pipe 32 to the compressor 12.

A damper 34 is pivotally mounted at 36 in the suction pipe 32. Damper 34 may be pivoted from a position in which it is in an axial plane of pipe 32 to various angular positions to reduce the flow of gas to the compressor 12. It should be understood that means other than the damper shown may be used to vary the flow to the compressor. For instance inlet vanes as shown in the patent to Hagen No. 1,989,413 can be used to vary the flow through the compressor. The rate of flow of gas through the compressor is one of the factors which determines the power required by the compressor and thus the current required by the motor 10. Therefore the position of the damper 34 determines the current drawn by the motor 10. A fluid motor 38 preferably of the pneumatic type has a rod 40 pivotally connected to the vane 32 at 42. A bellows 43 provides a seal between the rod 40 and the pipe 32. The bellows 43 is flexible to permit movement of the rod 40. The fluid motor 38 is of well known construction in which a piston or diaphragm translates pressures into rod positions.

It should be understood that the fluid devices described herein may be pneumatic and employ a gaseous medium such as air or they may be hydraulic and employ a liquid such as water.

A fluid amplifier type of thermostat indicated generally by numeral 44 is connected to receive air under pressure from a source 45. A source of alternating current 46 provides through diode 48 a pulsating direct current potential across a bridge circuit consisting of the resistors 50, 52, 54 and the temperature sensitive resistor 56. The values of the resistors are such that, when 50 is to 52 as 56 is to 54, the bridge is balanced and no voltage will appear between the points 58 and 60. The temperature responsive resistor 56 is in temperature sensing relationship with the evaporator 26 by placing it on the chilled water conduit conducting the chilled water from the evaporator 26 but it should be understood that the temperature of the evaporator 26 can be sensed by placing the resistor 56 directly on or in the evaporator 26.

As the temperature of the temperature sensitive resistor 56 decreases, its resistance will increase and the point 60 will be more negative than the point 58 causing a pulsating current to flow in the forward direction through the diode 62 and the electromagnet 64 of a vented fluid amplifier 65. A magnetically sensitive diaphragm 66, preferably made of iron, responds to the electromagnet and vibrates to produce pressure pulsations which disturb the air stream 68 and reduce the pressure in conduit 7.

If the resistor 56 is heated above the value at which the bridge is balanced, its resistance will become lower and the point 60 will be more positive than the point 58 impressing a potential in the reverse direction across the diode 62 and the coil 64. The diode 62 will not conduct in this direction and no current will flow in coil 64. It is thus apparent that the air stream 68 will be affected only by a decrease in the temperature of resistor 56.

Figure 2:
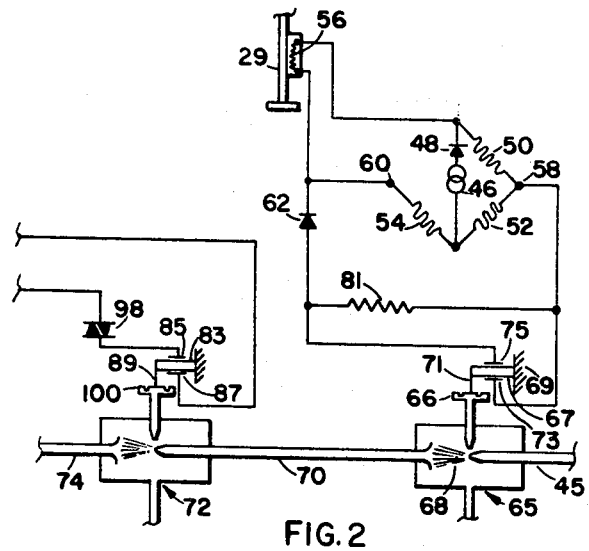
FIGURE 2 is a view of a modification of the invention in which a piezo-electric crystal is the motion producing means in the transducers.

Reference is now made to FIGURE 2 in which parts corresponding to those in FIGURE 1 are designated by the same numerals. A piezo-electric crystal 67 is secured at one end to a fixed base 69. The free end of crystal 69 has a pin 71 secured to the diaphragm 66. A conducting plate 73 is secured to the crystal 69 and is connected to point 58 and a conducting plate 75 is connected to the crystal and is connected through diode 62 to the point 60. A resistance 81 bridges the plates 73 and 75 to discharge these plates during the period when the diode 62 is not conducting. The potential appearing between the plates 73 and 75 dielectrically stresses the crystal 67 causing it to warp. Inasmuch as the potential is intermittent, the end of the crystal 67 vibrates and through pin 71 vibrates the diaphragm 66 with the results described with reference to FIGURE 1.

Figure 3:
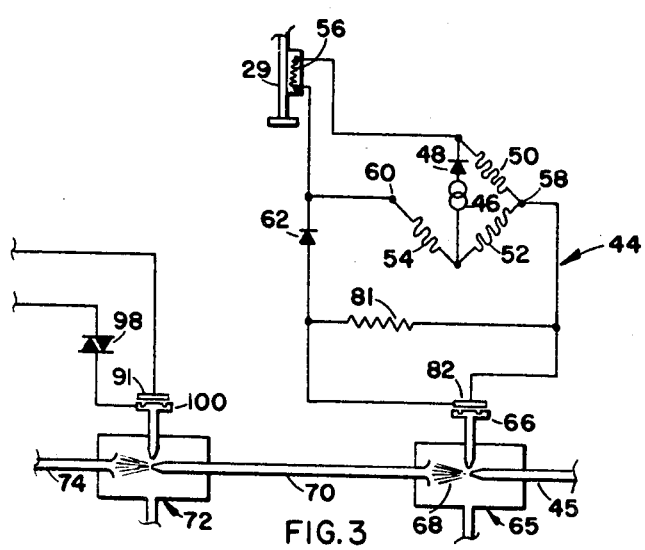
FIGURE 3 is a view of still another modification of the invention in which the electrostatic attraction between oppositely charged elements is the motion producing means in the transducers.

Reference is now made to FIGURE 3 in which parts corresponding to those in FIGURE 1 are designated by the same numerals. An electrostatic plate 82 is connected to point 58 of the bridge circuit and diaphragm 66 is connected through diode 62 to the point 60 of the bridge circuit. A resistance 81 bridges the plate 82 and the diaphragm 66 to discharge the plate 82 and the diaphragm 66 during the period when the diode 62 is not conductducting. Inasmuch as the electrostatic force is intermittent the diaphragm 66 is vibrated to operate the fluid amplifier 65 in a manner similar to that described with reference to FIGURE 1.

Referring again to FIGURE 1, conduit 70 feeds the pneumatic signal to a vented fluid amplifier indicated generally by numeral 72. Fuid amplifier 72 is part of the load limiting apparatus and will be described later. For the present, let us assume that the load on the motor is less than full load. Under this condition of operation, the pneumatic signal passes from conduit 70 to conduit 74 substantially unaffected by fluid amplifier 72.

A direct acting pneumatic relay 76 is connected to a source of pressure 77 and receives its pneumatic signal from conduit 74 and transmits its output through conduit 78 to the fluid motor 38. The pneumatic relay 76 is a well known device which operates responsively to the pressure of air from conduit 74 to effect delivery of pressure from a source 77 to conduit 78 at a pressure bearing a predetermined ratio to the pressure in conduit 74.

The load limiting device will now be described. The motor has three leads 90 connected to a source of electrical energy. A current transformer 92 has its primary winding 94 in one of the leads 90. The secondary winding 96 is bridged by a resistance 97. The resistance is tapped at various points to limit the motor current as desired. The potential across the resistance 97 which is proportional to the current flowing to the motor 10 causes a current to flow through a bi-directional blocking diode 98 and electromagnet 99 whenever the potential is in excess of the breakdown value of the bi-directional blocking diode 98. This causes the diaphragm 100 to vibrate producing pressure pulsations which disturb the air stream flowing from conduit 70 and prevents the pressure received by conduit 74 from increasing beyond a predetermined value. The pressure transmitted by relay 76 to conduit 78 is thus prevented from exceeding a predetermined value and consequently damper 34 is prevented from opening to a position which would cause the motor to draw a greater current than desired.

Referring to FIGURE 2, the diaphragm 100 is vibrated by a piezo-electric crystal 83 which has conducting plates 85 and 87 and a pin 89 connected between crystal 83 and diaphragm 100 for transmitting movement of the crystal to the diaphragm.

Referring to FIGURE 3, an electrostatic plate 91 is connected in the circuit to vibrate the diaphragm 100.

Figure 4:
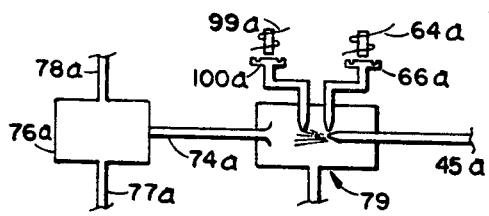
FIGURE 4 is a view of a modification of my control system in which a single amplifier is responsive to two control signals.

In FIGURE 4, the fluid amplifiers 65 and 72 have been combined into a single amplifier 79a. Parts which correspond to parts in FIGURE 1 have the same numbers except that the numbers are followed by an "a." It is apparent that vibration of diaphragms 66a and 100a will have a combined effect on the flow through the amplifier 79.

Although I have described specifically the preferred embodiments of my invention, I contemplate that changes may be made without departing from the scope or spirit of my invention, and I desire to be limited only by the claims.

I claim:

1. Refrigeration apparatus comprising a condenser, an evaporator, a compressor connected to draw refrigerant from said evaporator and discharge refrigerant into said condenser, means for driving said compressor, means for throttling the flow of gas to said compressor, a fluid motor for positioning said throttling means, means for producing an electric control signal responsive to a deviation of the temperature of the evaporator, means for conducting said electric control signal in one direction and preventing the flow of said electric control signal in the opposite direction, means in series with said conducting means for transducing said electric control signal to a fluid signal, means for amplifying said fluid signal and means for transmitting the amplified control signal to said fluid motor to position said throttling means.

2. Refrigeration apparatus comprising a condenser, an evaporator, a compressor connected to draw refrigerant from said evaporator and discharge refrigerant into said condenser, an electric motor for driving said compressor, adjustable means for throttling the flow of gas to said compressor, a fluid motor for positioning said adjustable throttling means, means for producing an electric control signal responsive to the deviation of the temperature and said evaporator in one direction only, means for transducing said electric control signal to a fluid signal, means for transmitting the fluid signal to said fluid motor to control the position of said throttling means, and means proportionally responsive to the magnitude of electrical energy drawn by said electric motor for proportionally modifying the fluid signal transmitted to said fluid motor to limit the opening of said throttling means.

3. Refrigeration apparatus comprising a condenser, an evaporator, a compressor connected to draw refrigerant from said evaporator and discharge refrigerant into said condenser, an electric motor for driving said compressor, means for throttling the flow of gas to said compressor, a fluid motor for positioning said throttling means, means for producing an electric control signal responsive to the deviation of the temperature of said evaporator in one direction only, means for transducing said electric control signal to a fluid signal, means for amplifying said fluid signal, means for transmitting the amplified fluid signal to said fluid motor to position said throttling means and means proportionally responsive to the electrical energy drawn by said electric motor for proportionally varying the fluid signal transmitted to said fluid motor when the electrical energy drawn by said electric motor exceeds a predetermined value.

4. Refrigeration apparatus comprising a condenser, an evaporator, a compressor connected to draw refrigerant from said evaporator and discharge refrigerant into said condenser, an electric motor for driving said compressor, means for throttling the flow of gas to said compressor, a fluid motor for positioning said throttling means, means for producing a first electric control signal responsive to the deviation of the temperature of said evaporator in one direction only, means for transducing said first electric control signal to a first fluid signal, means for producing a second electric signal proportioned to the magnitude of electrical energy drawn by said electric motor, electromotive means responsive to the magnitude of said second electric signal for producing a second fluid signal, means for transmitting said first and said second fluid signals to said fluid motor to position said throttling means.

5. Refrigeration apparatus according to claim 4 in which said electromotive means is electromagnetic means.

6. Refrigeration apparatus according to claim 4 in which said electromotive means is piezo-electric crystal means.

7. Refrigeration apparatus according to claim 4 in which said electromotive means is electrostatically charged plate means.

8. Refrigeration apparatus comprising a condenser, an evaporator, a compressor connected to draw refrigerant from said evaporator and discharge refrigerant into said condenser, an electric motor for driving said compressor, adjustable means for throttling the flow of gas to said compressor, a fluid motor for positioning said throttling means, fluid amplifier means connected to a source of fluid pressure, electromotive means for varying the output of said fluid amplifying means, means for producing an electric potential proportional to the magnitude of electrical energy drawn by said electric motor, a circuit for connecting said potential producing means in series through a bi-directional blocking diode and said electromotive means to vary the output signal from said fluid amplifier when the current drawn by said electric motor tends to exceed a desired value and means for transmitting the output signal from said fluid amplifying means to said fluid motor to position said throttling means.

9. Refrigeration apparatus according to claim 8 in which said electromotive means is electromagnetic means.

10. Refrigeration apparatus according to claim 8 in which said electromotive means is piezo-electric crystal means.

11. Refrigeration apparatus according to claim 8 in which electromotive means is electrostatically charged plate means.

12. A compressor, an electric motor for driving said compressor, adjustable means for throttling the flow of gas to said compressor, a fluid motor for positioning said throttling means, fluid amplifier means connected to a source of fluid pressure, electromotive means for varying the output of said fluid amplifying means, means for producing an electric potential proportional to the magnitude of electrical energy drawn by said electric motor, a circuit for connecting said potential producing means in series through a bi-directional blocking diode and said electromotive means to vary the output signal from said fluid amplifier when the current drawn by said electric motor tends to exceed a desired value and means for transmitting the output signal from said fluid amplifying means to said fluid motor to position said throttling means.

13. An electrofluid thermostat comprising a Wheatstone bridge, an alternating current source and a diode connected in series across the bridge circuit to provide a pulsating direct current across the bridge, said Wheatstone bridge having three ratio arms comprising resistances and one ratio arm comprising a resistor, the resistance of which is variable with temperature, said resistor being adapted to put in temperature sensing relationship with a substance to be controlled, an output circuit across said bridge, said output circuit including a diode and an electromotive means in series, a fluid amplifier having a fluid power input nozzle and a fluid power output channel arranged to receive a fluid stream from said fluid power input nozzle, fluid control means comprising a control nozzle arranged to discharge fluid to impinge on the power stream from said input nozzle to vary the effect of said input stream on said fluid power output channel, said fluid control means including a chamber having a flexible wall which is vibrated by said electromotive means to pulse fluid from and into said control nozzle to disturb the flow between said fluid power input nozzle and said power stream output nozzle.

14. An electrofluid thermostat according to claim 13 in which said electromotive means is an electromagnet.

15. An electrofluid thermostat according to claim 13 in which said electromotive means comprises a piezoelectric crystal.

16. An electrofluid thermostat according to claim 13 in which said electromotive means is a plate in electrostatic relationship with the flexible wall of the chamber.

17. An electrofluid thermostat comprising a bridge circuit having a temperature sensing element as one arm thereof, means for energizing said bridge circuit, fluid amplifying means connected to a source of fluid pressure, electromotive means for varying the output of said fluid amplifying means, and means for conducting the output potential of said bridge circuit in one direction through said electromotive means while preventing flow therethrough in the opposite direction.

References Cited
UNITED STATES PATENTS

| | | | |
|---|---|---|---|
| 2,975,976 | 3/1961 | Smith | 236—84 XR |
| 3,003,700 | 10/1961 | Joesting | 236—84 XR |
| 3,103,107 | 9/1963 | Ehlke | 62—217 XR |

MEYER PERLIN, *Primary Examiner.*